(12) United States Patent
Misra et al.

(10) Patent No.: US 11,053,164 B2
(45) Date of Patent: Jul. 6, 2021

(54) SOLAR CONTROL GLASS ARTICLE

(71) Applicant: SAINT-GOBAIN GLASS FRANCE, Courbevoie (FR)

(72) Inventors: Soumyadeep Misra, Tamil Nadu (IN); Arpan Basu, West Bengal (IN); Shrijit Sudhir Kulkarni, Maharashtra (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/769,141

(22) PCT Filed: Nov. 26, 2018

(86) PCT No.: PCT/IN2018/050785
§ 371 (c)(1),
(2) Date: Jun. 2, 2020

(87) PCT Pub. No.: WO2019/111273
PCT Pub. Date: Jun. 13, 2019

(65) Prior Publication Data
US 2020/0369561 A1 Nov. 26, 2020

(30) Foreign Application Priority Data
Dec. 8, 2017 (IN) .............................. 201741044123

(51) Int. Cl.
*B32B 17/06* (2006.01)
*B32B 15/04* (2006.01)
*C03C 17/36* (2006.01)

(52) U.S. Cl.
CPC ........ *C03C 17/366* (2013.01); *C03C 17/3626* (2013.01); *C03C 17/3644* (2013.01);
(Continued)

(58) Field of Classification Search
CPC .............. C03C 17/366; C03C 17/3626; C03C 17/3644; C03C 17/3652; C03C 17/3681;
(Continued)

(56) References Cited

U.S. PATENT DOCUMENTS 8,337,988 B2 * 12/2012 Knoll ..................... C03C 17/36
428/432
9,028,956 B2 * 5/2015 Knoll ................. C03C 17/3626
428/220
(Continued)

FOREIGN PATENT DOCUMENTS

CN 102219396 * 10/2011
CN 202626038 * 12/2012
(Continued)

OTHER PUBLICATIONS

International Search Report as issued in International Patent Application No. PCT/IN2018/050785, dated Jan. 17, 2019.

*Primary Examiner* — Lauren R Colgan
(74) *Attorney, Agent, or Firm* — Pillsbury Winthrop Shaw Pittman LLP (57) ABSTRACT

A solar control glass article includes a transparent substrate provided with a thin multilayer coating having solar control properties. The thin multilayer coating includes an absorber layer sandwiched between a first and second transparent dielectric layers, a functional layer protected by an upper and lower blocker layers and a third transparent dielectric layer provided over the upper blocker layer. The thickness of the functional layer and the thickness of the transparent dielectric layers are adjusted to give a gold colored reflection on a surface opposite to the first surface of the transparent substrate provided with a thin multilayer coating.

20 Claims, 5 Drawing Sheets

(52) U.S. Cl.
CPC ...... *C03C 17/3652* (2013.01); *C03C 17/3681*
(2013.01); *C03C 2217/256* (2013.01); *C03C
2217/281* (2013.01); *C03C 2217/73* (2013.01)

(58) Field of Classification Search
CPC ........ C03C 2217/256; C03C 2217/281; C03C
2217/73
USPC ........................................ 428/428, 432, 434
See application file for complete search history.

(56) References Cited

U.S. PATENT DOCUMENTS

| | | |
|---|---|---|
| 2005/0208281 A1 | 9/2005 | Decroupet et al. |
| 2009/0047466 A1* | 2/2009 | German .............. C03C 17/3652 428/98 |
| 2010/0072884 A1 | 3/2010 | Tchakarov et al. |
| 2011/0300319 A1* | 12/2011 | Reymond ............... C03C 17/36 428/34 |
| 2011/0305853 A1* | 12/2011 | Reymond ............... C03C 17/36 428/34 |
| 2019/0064409 A1* | 2/2019 | Shimoda ................ G02B 5/285 |

FOREIGN PATENT DOCUMENTS

| | | | |
|---|---|---|---|
| CN | 204340313 U | | 5/2015 |
| CN | 105084781 | * | 11/2015 |
| CN | 206109216 | * | 4/2017 |
| CN | 108455876 | * | 8/2018 |

* cited by examiner

FIG. 7

SOLAR CONTROL GLASS ARTICLE

CROSS-REFERENCE TO RELATED APPLICATIONS

This application is the U.S. National Stage of PCT/IN2018/050785, filed Nov. 26, 2018, which in turn claims priority to Indian patent application number 201741044123 filed Dec. 8, 2017. The content of these applications are incorporated herein by reference in their entireties.

TECHNICAL FIELD

The present disclosure relates, in general to a coated glass article, and more specifically to a colored solar control glass article having a gold colored reflection and a method of making the same.

BACKGROUND

Solar control coatings are known in the art that are usually made of two or more layers of metal or metallic oxide (typical metals include titanium, zinc, copper, tin, and silver, and typical alloys include brass and stainless steel). These coatings are microscopically thin, yet give a slightly brown or gray color to the glass substrate bearing them. The exact form and thickness of the coating vary quite widely depending on the manufacturer and its application. Early solar control coatings often had a layer of silver sandwiched between two layers of dielectric materials. Later metals other than silver were also used for solar control coatings. These coatings reduced emissivity and allowed high light transmission.

Solar control coatings having a stack of thin layer comprising glass/$Si_3N_4$/Nb/$Si_3N_4$ are known in the art, where the metallic Nb layer is the sole infrared (IR) reflecting layer in the coating. In certain instances, the Nb IR reflecting layer may be nitrided. While such a stack of thin layers provides efficient solar control, the reflection color obtained by such layer stacks has never been worked upon. For example, a known solar control coating having a layer stack of glass/$Si_3N_4$/NbN/$Si_3N_4$ has an external a* value in a range between −3 to +3; and b* value in a range between −20 to +10. This implies that a glass article with the above solar control layer stack would have a neutral to blue/green to light yellow external reflection.

Solar control glasses employing various layers of Nb, Ni, NiCr and/or $Si_3N_4$ to sandwich one or more layers of IR reflecting metallic silver between them in a prescribed order to achieve desired properties are also known in the art. While such five or six layered stack constituted significant improvement over the existing prior art layer stacks, particularly those discussed in the early part of this disclosure, there still remains room for improvement in the characteristic of color of external reflection.

Referring to Chinese utility model CN204340313 describes a glass curtain wall or door that uses a light gray color low-e glass. The glass provides a gray color tone for the customers to select from low-e energy saving glass products. The utility model comprises of a float glass substrate provided with the following layers in a sequential order: first layer of silicon nitride ($SiN_x$), niobium nitride ($NbN_x$) layer, the second layer of silicon nitride ($SiN_x$), first metallic chromium layer NiCr, the metallic silver (Ag) layer, the second metal chromium layer NiCr, the third layer of silicon nitride ($SiN_x$). The glass article coated with the above solar control coating exhibits a gray color.

Referring to a PCT application 200204806 assigned to the assignee of the present disclosure, describes a glazing comprising a stack of thin layers including alternatively n functional layer(s) with infrared and/or solar radiation reflection properties and n+1 coats consisting of one or several layers of dielectric material such that each functional layer is arranged between two coats and having a blue-green color in reflection. The solar control articles described in the cited references do not result in golden color in external reflection and primarily focus on achieving solar control properties and have a gray or blue-green color in external reflection.

Notwithstanding all the past experience and technology which are available for producing solar control coated articles, it has been discovered that although these coated articles are effective in solar control, the layer stack was never engineered to have different colors in external reflection. Hence there is scope for obtaining a different reflection color while retaining their solar control properties. For example, most of the solar control glass articles available currently in the market have a neutral (gray) or blue-green color in external reflection. The emerging market trends have revealed that bluish-green color is not to everyone's liking and may not be appropriate for every kind of building. Further it has also emerged that there is a desire to obtain a golden color external reflection. Since solar control articles are generally more expensive than their ordinary counterparts, it becomes more important to ensure that the extra cost is justified by the combination of solar control properties and desired/preferred aesthetics.

Further, it has been found that the color of the external and internal refection of these articles can be improved upon by working on the dielectric layers and functional layers of the solar control layer stack. The external reflection of the solar control coated articles can be varied by varying the coating thickness of the $Si_3N_4$ layers and silver layers of the solar control layer stack.

The present disclosure relates to a gold colored low-e glass article that comprises of a thin multilayer stack comprising a niobium nitride absorber layer sandwiched between two transparent dielectric layers, a silver functional layer protected by an upper and lower blocker layers and a third transparent dielectric layer provided over the upper blocker layer on one side of a transparent substrate. The thickness of the silver functional layer and the dielectric layers is adjusted to give a gold colored reflection on the other side of the transparent substrate while retaining its solar control properties.

Thus these coatings can block/reflect part of the solar spectra very efficiently in addition to having a golden colored appearance. The light transmission from exterior to interior of a building incorporated with these coated solar control glass articles is also decreased thereby reducing glare for the building occupants.

SUMMARY OF THE DISCLOSURE

In one aspect of the present disclosure, a solar control glass article comprising a transparent substrate provided with a thin multilayer coating having solar control properties on one of its surface is disclosed. The thin multilayer coating comprises an absorber layer sandwiched between a first and second transparent dielectric layers, a functional layer protected by an upper and lower blocker layers and a third transparent dielectric layer provided over the upper blocker layer. The lower blocker layer is provided directly over the second transparent dielectric layer lying above the absorber layer. The thickness of the functional layer and the thickness of the transparent dielectric layers are adjusted to give a gold colored reflection on a surface opposite to the first surface of the transparent substrate provided with a thin multilayer coating.

In one other aspect of the present disclosure, a composite glazing comprising a plurality of glass substrates is disclosed. One of the glass substrates of the plurality of glass substrates is the solar control glass article of the present disclosure. In one another aspect of the present disclosure, an insulated glazing incorporating the solar control glass article or the composite glazing comprising the solar control glass article is also disclosed.

Other features and aspects of this disclosure will be apparent from the following description and the accompanying drawings.

BRIEF DESCRIPTION OF THE DRAWINGS

Embodiments are illustrated by way of example and are not limited to those shown in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Wherever possible, the same reference numbers will be used throughout the drawings to refer to the same or similar parts. Embodiments disclosed herein are related to colored solar control glass articles.

Figure 1:
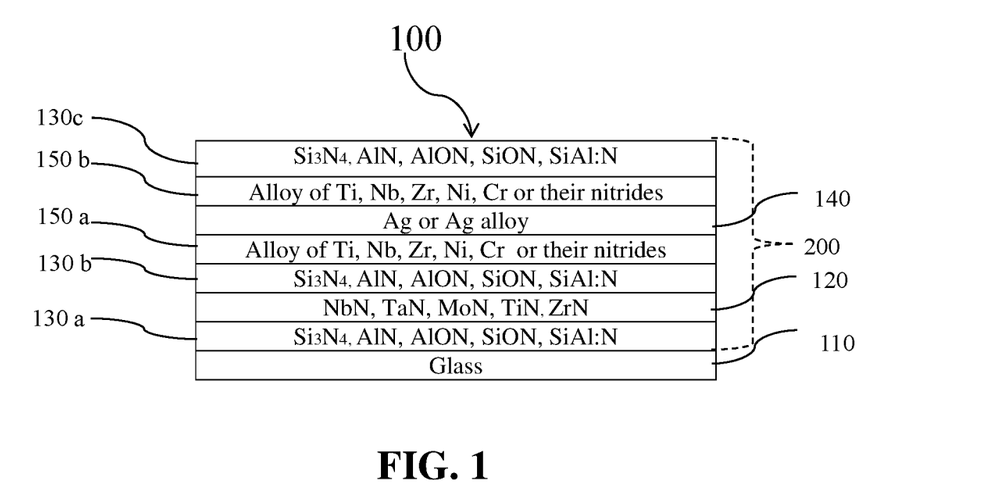
FIG. 1 illustrates a solar control glass article, according to one embodiment of the present disclosure.

A solar control glass article 100 according to one embodiment of the present disclosure is illustrated in FIG. 1. The solar control glass article 100 comprises of a glass substrate 110 provided with a thin multilayer coating 200. The thin multilayer coating 200 comprises of a metal nitride absorber layer 120 sandwiched between a first and second transparent dielectric layers 130a, 130b; a silver metal or silver alloy functional layer 140 protected by an upper blocker layer 150b and a lower blocker layer 150a; and a third transparent dielectric layer 130c. The dielectric layer 130a is in direct contact with the glass substrate 110 and the dielectric layer 130b is provided above the metal nitride absorber layer 120. The lower blocker layer 150a is provided directly over second transparent dielectric layer 130b.

The thin multilayer coating 200 has the following stack in sequential order from the transparent substrate 110 glass/first transparent dielectric layer 130a/metal nitride absorber layer 120/second transparent dielectric layer 130b/lower blocker layer 150a/silver metal or metal alloy functional layer 140/upper blocker layer 150b/third transparent dielectric layer 130c.

The metal nitride absorber layer 120 comprises of a metal nitride selected from the group consisting of niobium, tantalum, molybdenum, titanium and zirconium. In a specific embodiment, the metal nitride absorber layer 120 comprises of niobium nitride (NbN). The thickness of the metal nitride absorber layer 120 is greater than 1 nm and less than 10 nm. The first and second transparent dielectric layers 130a, 130b are based on aluminium nitride, aluminium oxynitride, silicon nitride or silicon oxynitride or silicon aluminium nitride. In specific embodiments, the first and second transparent dielectric layers 130a, 130b are silicon nitride. The thickness of the first transparent dielectric layer 130a is greater than 10 nm and less than 30 nm. The thickness of the second transparent dielectric layers 130b is greater than 10 nm and less than 40 nm.

The upper and lower blocker layers 150b, 150a comprise of a metal alloy selected from the group consisting of titanium, niobium, zirconium, nickel, chromium or their nitrides thereof. In a specific embodiment, the upper and lower blocker layers 150b, 150a comprise of NiCr. In another specific embodiment, the upper and lower blocker layers 150b, 150a comprise of NiCrN. The thickness of the upper and lower blocker layers 150a, 150b is greater than 0.5 nm and less than 5 nm. The thickness of the silver metal or silver alloy functional layer 140 is greater than 5 nm and less than 15 nm. The third transparent dielectric layer 130c provided above the upper blocker layer 150b is based on aluminium nitride, aluminium oxynitride, silicon nitride, silicon oxynitride or silicon aluminium nitride and has a thickness greater than 50 nm and less than 90 nm.

In one embodiment of the present disclosure, the thickness of the metal nitride absorber layer 120 and the silver metal or silver alloy functional layer 140 is adjusted to obtain a desired light transmission through the solar control glass article 100. In another embodiment, the thickness of the transparent dielectric layers 130a, 130b, 130c is adjusted to optimize the reflectance and color of the transparent substrate 110.

Figure 2:
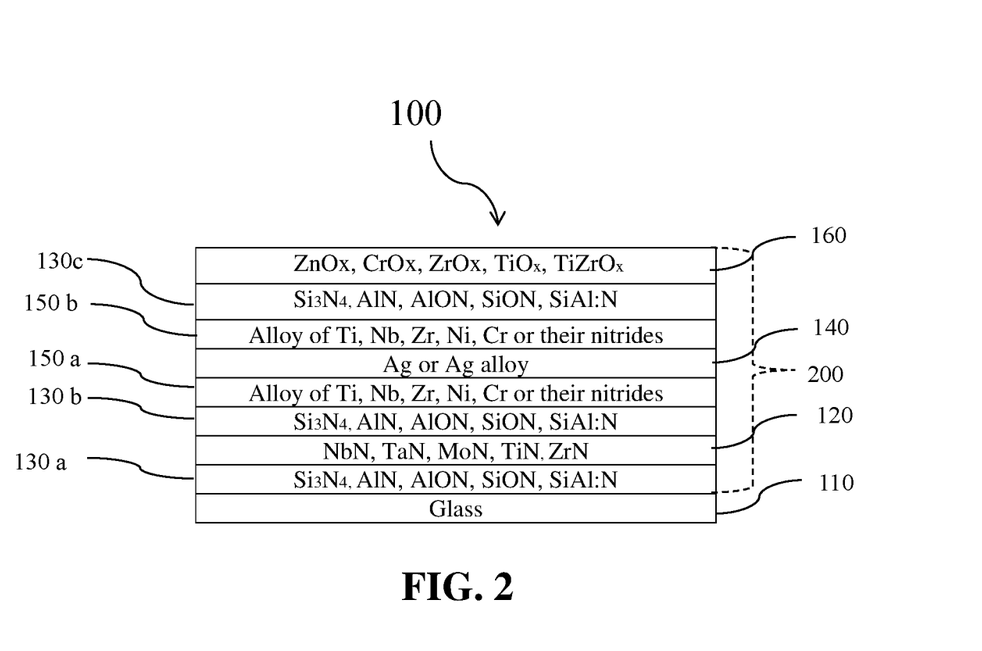
FIG. 2 illustrates a solar control glass article, according to another embodiment of the present disclosure.

FIG. 2 illustrates a solar control glass article 100 according to another embodiment of the present disclosure. The thin multilayer coating 200 illustrated in FIG. 2 optionally comprises of an over layer 160 provided above the third transparent dielectric layer 130c. The over layer 160 comprises of at least one metal oxide selected from the group consisting of titanium, zinc, chromium or zirconium or their alloys or combinations thereof. In one specific embodiment, the over layer 160 comprises of titanium oxide ($TiO_x$) or titanium zirconium oxide ($TiZrO_x$). The over layer 160 has a thickness greater than 3 nm and less than 10 nm. The over layer 160 acts as a protective layer and provides chemical and mechanical durability to the thin multilayer coating 200.

Thus the thin multilayer coating 200, according to the embodiment illustrated in FIG. 2 has the following stack in sequential order from the transparent substrate 110 Glass/first transparent dielectric layer 130a/metal nitride absorber layer 120/second transparent dielectric layer 130b/lower blocker layer 150a/silver metal or metal alloy functional layer 140/upper blocker layer 150b/third transparent dielectric layer 130c/over layer 160.

In one embodiment, the thin multilayer coating 200 is applied on the transparent substrate 110 by physical vapor deposition using magnetron sputtering. In alternate embodiments, other suitable coating techniques may be used to obtain the multilayer coating 200. The glass substrate 110 provided with the thin multilayer coating 200 can be heat treated to a temperature above 500° C. and below 750° C. in order to obtain a heat treated solar control glass article. Alternatively, the glass substrate 110 provided with the thin multilayer coating 200 can be annealed at a temperature between 100° C. and 250° C. Thus the solar control glass article 100 described in the present disclosure serves a dual purpose by being able to be used in its annealed and tempered form.

Figure 3:
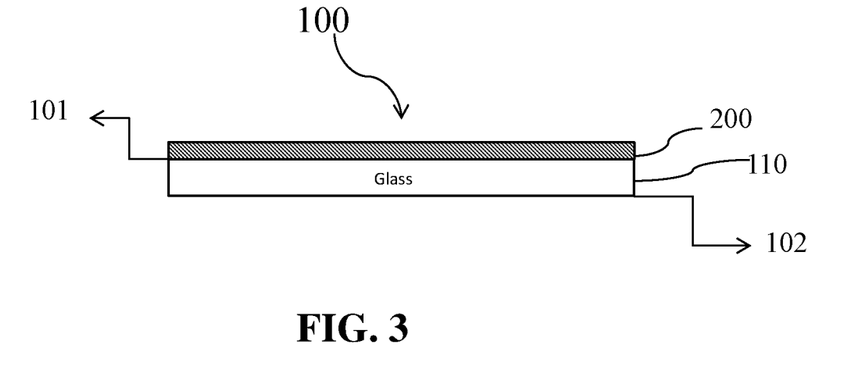
FIG. 3 illustrates a transparent substrate, according to one embodiment of the present disclosure.

FIG. 3 illustrates a glass substrate 110 provided with the thin multilayer coating 200 of the present disclosure. In multiple embodiments, the glass substrate 110 may be a clear glass or a tinted glass. The multilayer coating 200 is provided on the coating side (C) 101 of the transparent substrate 110. When the solar control glass article 100 of the present disclosure is installed in a building the coating side 101 provided with the thin multilayer coating 200 faces the inside of a building. In such an arrangement, the glass side (G) 102 opposite to the coating side (C) 101 of the transparent substrate 110 exhibits a gold color reflection when viewed from outside the building. The thickness of the transparent dielectric layers 130a, 130b, 130c and the silver metal or silver alloy functional layer 140 can be engineered to obtain an aesthetically improved gold color reflection while retaining the solar control properties of the glass substrate 110.

Figure 4:
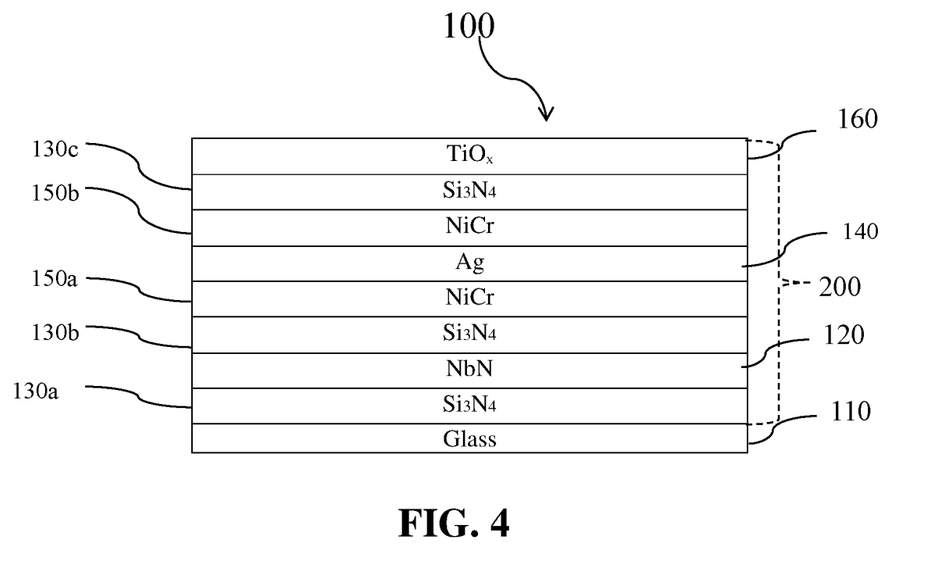
FIG. 4 illustrates a solar control glass article, according to one specific embodiment of the present disclosure.

A solar control article 100 according to one specific embodiment of the present disclosure is illustrated in FIG. 4. The thin multilayer coating 200 illustrated in this embodiment comprises of a niobium nitride absorber layer 120 sandwiched between the first and second transparent silicon nitride dielectric layers 130a and 130b. Provided above the second transparent silicon nitride dielectric layer 130b is a silver metal functional layer 140 protected by an upper and lower nickel chromium blocker layer 150b, 150a. The third transparent dielectric layer 130c is provided above the upper nickel chromium blocker layer 150b. Further a $TiO_x$ over layer 160 is applied above the third transparent dielectric layer 130c.

The transparent silicon nitride dielectric layer 130a acts as a barrier layer that prevents ion diffusion from the glass substrate 110 and further protects the niobium nitride absorber layer 120 and all the transparent silicon nitride dielectric layers 130a, 130b, 130c thereby contributing to the optical property of the solar control glass article 100. The niobium nitride absorber layer 120 controls the reflection and color on the glass side (G) 102 of the transparent substrate 110. The upper and lower nickel chromium blocker layers 150b, 150a protect the silver metal functional layer 140 and also provide mechanical strength and promote adhesion of the functional layer in the stack constituting the thin multilayer coating 200. The silver metal functional layer 140 reflects the near infrared (NIR) portion of the solar spectrum and contributes to the solar control property of an insulated glazing comprising the solar control glass article 100. The $TiO_x$ over layer 160 acts as a protective layer for preventing mechanical and chemical damages to the thin multilayer coating 200.

Thus the thin multilayer coating 200, according to the embodiment illustrated in FIG. 4 has the following stack in sequential order from the transparent substrate 110 Glass/ first silicon nitride layer/niobium nitride layer/second silicon nitride layer/lower nickel chromium blocker/silver metallic layer/upper nickel chromium blocker/third silicon nitride/ $TiO_x$ layer. The transparent substrate 110 provided with the thin multilayer coating 200 can be annealed at a temperature between 100° C. and 250° C. or heat treated to a temperature above 500° C. and below 750° C.

The thickness of the third dielectric silicon nitride layer 130c is controlled to increase the b* value to at least above 10 (measured on the glass side G outside the building) of the solar control glass article 100. A positive b* ($b^*_{Ext}$>10) value gives a yellowish appearance on the glass side 102 opposite to the coating side 101 (provided with the thin multilayer coating 200) of the transparent substrate 110 and contributes to the gold color reflection of the solar control glass article 100 on the glass side 102. Similarly, a* value (measured on the glass side G outside the building) is also engineered to be as close to neutral as possible ($a^*_{Ext}$~0). A slightly positive a* value in combination with the b* value results in golden color and helps avoiding greenish tint in the external reflection. However, in case of $a^*_{Ext}$>4 the red color dominates and hence should be avoided for the desired aesthetic of the present disclosure. Further a positive $b^*_T$ (~8-10) helps in obtaining a golden color appearance. The light transmission of the solar control glass article 100 is measured between 15%-40% depending on the thickness of metallic silver functional layer 140.

In another embodiment of the present disclosure, a composite glazing comprising a plurality of glass substrates bonded together by a polymeric interlayer is disclosed. One of more glass substrates of the plurality of glass substrates can be a solar control glass article 100. In one aspect of the embodiment, the polymeric interlayer is made of polyvinyl butyral (PVB) and/or other organic polymers selected from the group consisting of polyurethane and/or ethylvinylacetate (EVA) and/or polyvinyl chloride and/or polyester and/ or polyethylenevinylacetate (PET) and/or polycarbonate and/or polypropylene and/or polyethylene and/or polyurethacrylate or their combinations thereof.

Figure 5:
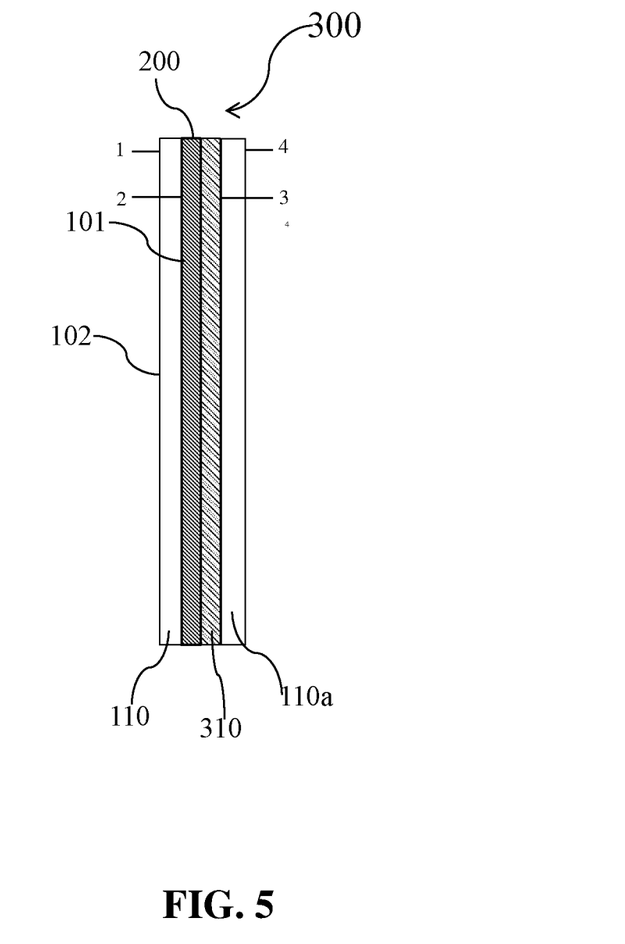
FIG. 5 illustrates a composite glazing comprising the solar control glass article, according to one embodiment of the present disclosure.

FIG. 5 illustrates a composite glazing 300 according to one embodiment of the present disclosure. The composite glazing 300 comprises of a heat treated solar control glass article 100 or annealed solar control glass article 100 bonded to another glass substrate 110a through a polymer interlayer 310. The glass substrate 110a may be a clear or tinted glass substrate. The coating side (C) 101 of the transparent substrate 110 provided with the thin multilayer coating 200 is in direct contact with the polymeric interlayer 310, that is the thin multilayer coating 200 is preferably on face 2 or face 3 of the composite glazing 300, the faces of substrates being numbered from outside to the inside of the building or room which is equipped with the composite glazing 300. The thin multilayer coating 200 does not react with the polymeric interlayer 310 and hence the light transmission values and external reflection of the solar control glass article 100 remains unchanged.

Figure 6:
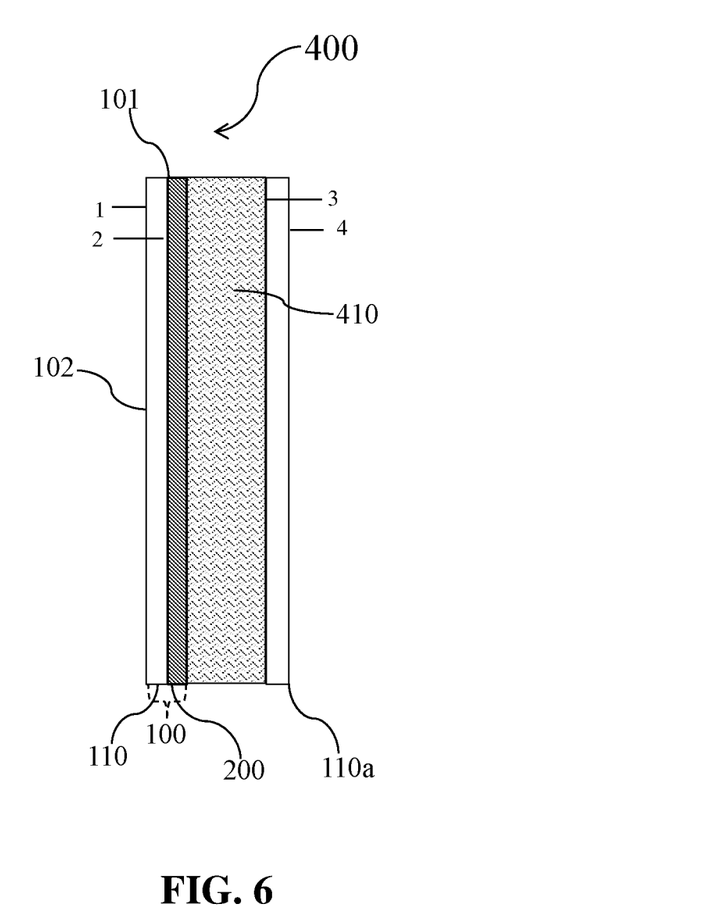
FIG. 6 illustrates a double glazing unit comprising the solar control glass article, according to one embodiment of the present disclosure.

In another embodiment of the present disclosure, an insulated glazing incorporating the solar control glass article 100 is disclosed. FIG. 6 illustrates a double glazing unit (DGU) 400, according to one embodiment of the present disclosure. The DGU 400 has the solar control glass article 100 mounted in a double glazing with a second glass substrate 110a selected from a clear or tinted glass. In few other embodiments, the second glass substrate 110a may also be a coated glass similar to the solar control glass article 100. The thin multilayer coating 200 is on face 2 and there exists an air gap 410 between the two glass substrate 110, 110a. In alternate embodiments, the air gap may be replaced Argon, Krypton or their combination thereof. These DGUs are intended for glazing in buildings that contribute to thermal insulation and solar control.

Figure 7:
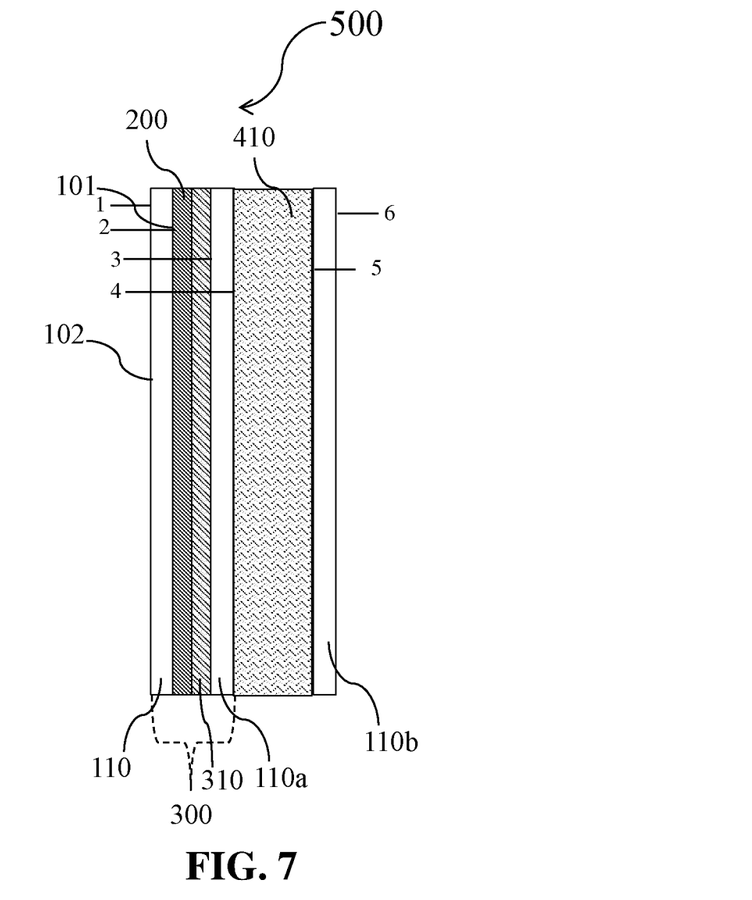
FIG. 7 illustrates a double glazing unit comprising the composite glazing, according to yet another embodiment of the present disclosure.

In another aspect of the present embodiment, a DGU comprising a composite glazing 300 is also disclosed. FIG. 7 illustrates a DGU 500 that comprises a composite glazing 300 mounted in a double glazing with another glass substrate 110b. In one embodiment, the other glass 110b may be a clear or tinted glass. In few other embodiments the other glass 110b may comprise a coated glass similar to the solar control glass of the present disclosure. This embodiment also has the thin multilayer coating 200 on face 2, and there exists an air gap 410 between the composite glazing 300 and the glass substrate 110b. In alternate embodiments, the air gap 410 may be replaced Argon, Krypton or their combination thereof. In yet another alternate embodiment the thin multilayer coating 200 may also be provided on face 4, the faces of substrates being numbered from outside to the inside of the building or room which is equipped with the DGU comprising a composite glazing. The composite glazing has the thin multilayer coating 200 provided on face 4, the faces of substrates being numbered from outside to the inside of the building or room.

In the following examples, the layer stacks were deposited by magnetron sputtering at room temperature on a transparent glass substrate having a thickness of 6 mm and heat treated at 650° C. The heat treated coated transparent substrate was configured into a DGU with 12 mm air gap along with an annealed/heat treated clear glass substrate of 6 mm thickness.

Example 1

Gold Colored Heat Treated Solar Control Glass

The glass substrate was coated with the below shown stack of thin layers 1:
Layer stack 1 Glass//$Si_3N_4$ (12.9)/NbN (2.9)/$Si_3N_4$ (22.8)/NiCr (2.6)/Ag (12.4)/NiCr (3.7)/$Si_3N_4$ (68.4)/$TiO_X$ (4)

The configuration of a DGU comprising the glass substrate coated with the stack of thin layers 1 was 6*nm-12 nm-6 nm. Optical properties of the DGU configured from the transparent substrate coated with the above layer stack and heat treated at 650° C. are summarized in Table 1.

TABLE 1

Optical Properties of Gold Colored Heat Treated Solar Control Glass

| | Transmission | | | Outside | | | Inside | | | Emissivity |
|---|---|---|---|---|---|---|---|---|---|---|
| | $T_L$ | $a^*_T$ | $b^*_T$ | $R_{Ext}$ | $a_{Ext}$ | $b^*_{Ext}$ | $R_{Int}$ | $a^*_{Int}$ | $b^*_{Int}$ | E |
| Layer Stack 1 | 21.7 | −0.2 | 9.2 | 22.6 | −0.1 | 23.6 | 34.8 | −5.5 | −16.6 | 0.04 |

$R_{Ext}$ = External reflection; $a^*_{Ext}$, $b^*_{Ext}$ = a*, b* values measured on glass side;
$R_{Int}$ = Internal reflection; $a^*_{Int}$, $b^*_{Int}$ C = a*, b* values measured on the internal side The increased thickness of the third dielectric layer 130c (>50 nm) increases the $b^*_{Ext}$ value on the outside of the coated glass substrate that results in a golden appearance on the glass side (that is on the building exterior). The thicker dielectric layer 130c also pushes the interior $b^*_{Int}$ value to a negative range that results in a bluish gray color on the coating side (that is on the building interior). The presence of niobium nitride layer provided more control on the external color and reflection. Transparent glass has an emissivity of 89%, whereas the gold colored heat treated solar control glass article provided in Example 1 has as less as 4%. The DGU comprising the heat treated solar control glass substrate of the present disclosure recorded a solar factor equal to 0.22. Further the U-value was found to be 1.6 W/m²/K.

Durability Studies

The following durability studies were performed for the glass substrate coated with the layer stack shown above.

Erichsen Brush Test

The brush test was used to evaluate the resistance of the thin multilayer coating 200 to erosion caused by scrubbing. In this test a soft brush was rubbed against the thin multilayer coating 200 where the coating was submerged in the water. This test was done to test mechanical robustness against washing machine brushes during processing.

The transparent substrates were heat treated at a temperature of 650° C. after the Erichsen brush test. This step reveals the presence of any minor scratches that occurred during the test procedure. However, the tested samples did not show any sign of scratches.

In another experiment, the transparent substrates coated with the thin multilayer coating 200 were first heat treated at a temperature of 650° C. and then subjected to the Erichsen brush test procedure. Again the samples did not show any sign of scratch or coating delamination.

TABLE 2

Results of Durability Studies

| | | Results | | | |
|---|---|---|---|---|---|
| Name of the test | Target/ Specifications | Sample 1 | Sample 2 | Sample 3 | Sample 4 |
| Erichsen Brush Test (350 cycles) | No pinholes, scratches or delamination observed | Pass | Pass | Pass | Pass |

Example 2

Three glass substrates were coated with the below shown stack of thin layers 2, 3 & 4:
Layer stack 2 Glass//$Si_3N_4$ (12.9)/NbN (2.9)/$Si_3N_4$ (22.8)/NiCr (2.6)/Ag (12.4)/NiCr (3.7)/$Si_3N_4$ (40)/$TiO_X$ (4)
Layer stack 3 Glass//$Si_3N_4$ (12.9)/NbN (2.9)/$Si_3N_4$ (22.8)/NiCr (2.6)/Ag (12.4)/NiCr (3.7)/$Si_3N_4$ (100)/$TiO_X$ (4)
Layer stack 4 Glass//$Si_3N_4$ (12.9)/NbN (2.9)/$Si_3N_4$ (22.8)/NiCr (2.6)/Ag (4)/NiCr (3.7)/$Si_3N_4$ (50)/$TiO_X$ (4)

Optical properties of the DGU (6*nm-12 nm-6 nm) configured from the transparent substrate coated with the above layer stacks and heat treated at 650° C. are summarized in Table 3.

TABLE 3

Optical Properties of Heat Treated Solar Control Glass

| | Transmission | | | Outside | | | Inside | | |
|---|---|---|---|---|---|---|---|---|---|
| | $T_L$ | $a^*_T$ | $b^*_T$ | $R_{Ext}$ | $a_{Ext}$ | $b^*_{Ext}$ | $R_{Int}$ | $a^*_{Int}$ | $b^*_{Int}$ |
| Layer Stack 2 | 27.6 | −4.8 | −4 | 14.2 | 1.4 | 7 | 18.7 | 7.3 | 13.8 |
| Layer Stack 3 | 15.85 | 1.6 | −0.55 | 18.5 | 5.8 | 24.9 | 50.9 | −6.75 | 0.76 |
| Layer Stack 4 | 36.6 | −4.4 | −0.41 | 17.6 | −3.4 | 8 | 11.1 | 8 | −4.2 |

$R_{Ext}$ = External reflection; $a^*_{Ext}$, $b^*_{Ext}$ = $a^*$, $b^*$ values measured on glass side;
$R_{Int}$ = Internal reflection; $a^*_{Int}$, $b^*_{Int}$ C = $a^*$, $b^*$ values measured on the internal side Example 2 was constructed to infer that the thickness of the third dielectric layer 130c played an important role in determining the external reflection color of the solar control glass substrate along with their light transmission levels and solar control properties. From table 3 it became evident that the layer stack 2 that had the thickness of the third dielectric layer 130c decreased to 40 nm exhibited a less positive b*Ext value in external reflection. Hence the coated glass substrate appeared less yellowish in external reflection and does not exhibit the desired golden color aesthetics.

Similarly, for the layer stack 3 where the thickness of the third dielectric layer 130c was increased above 100 nm, although the b*Ext value remained in the desired range, $a^*_{Ext}$ became greater than 5 which resulted in an undesired reddish tinge in the external color. Moreover, $b^*_T$ became less than zero and this again did not result in the desired golden color external appearance. The internal reflection $R_{int}$ was also found to be very high for the layer stack 3. In layer stack 4 the silver functional layer was deposited in 4 nm thickness and the third dielectric layer was deposited in 50 nm thickness. Here again the results were found to be far-fetched from having a gold colored external appearance ($b^*_T<0$, $a^*_{Ext}<0$) and the desired levels of solar control performance.

It should be noted that the above examples are only indicative and does not limit the scope of the invention in any manner. The brightness of the external color reflected by the solar control glass articles may be varied by varying the reflection values ($R_{int}$ and $R_{ext}$).

Comparative Example 1

The example given below illustrate various embodiments of the present disclosure and allows the characteristics of the thin multilayer coating obtained according to the prior art and according to the present disclosure to be compared.

TABLE 4

Comparative Example 1

| Stack identification | Thickness (nm) | |
|---|---|---|
| Layer | CN204340313 U | Present Disclosure |
| $TiO_x$ | Nil | 4 |
| $Si_3N_4$ | 80-160 | 68.4 |
| NiCr | 3-10 | 3.7 |
| Ag | 3-9 | 12.4 |
| NiCr | 3-10 | 2.6 |
| $Si_3N_4$ | 30-80 | 22.8 |
| NbN | 10-30 | 2.9 |
| $Si_3N_4$ | 30-100 | 12.9 |
| Glass | Float glass | 6 mm glass |

It was evident that the prior art document focus on having thicker dielectric layers both above the transparent substrate and above the metal nitride absorber layer. On the contrary the present disclosure provides a thin multilayer coating having a very thin dielectric layer above the transparent substrate and a relatively thinner dielectric layer above the metal nitride absorber layer as shown in Table 3. Further, the thickness of the third dielectric layer provided above the upper blocker layer contributes to the gold color of the coated solar control article of the present disclosure.

The optical performance of the prior art reference is tabulated in Table 5.

TABLE 5

Comparative Optical Performance Results

| | Transmission | | | Outside | | | Inside | | |
|---|---|---|---|---|---|---|---|---|---|
| | $T_L$ | $a^*_T$ | $b^*_T$ | $R_{Ext}$ | $a_{Ext}$ | $b^*_{Ext}$ | $R_{Int}$ | $a^*_{Int}$ | $b^*_{Int}$ |
| CN204340313U | 48.1 | −3.5 | −4.5 | 16 | −1.5 | −2.15 | 5.3 | — | — |
| Present Disclosure | 21.7 | −0.2 | 9.2 | 22.6 | −0.1 | 23.6 | 34.8 | −5.5 | −16.6 |

$R_{Ext}$ = External reflection; $a^*_{Ext}$, $b^*_{Ext}$ = $a^*$, $b^*$ values measured on glass side;
$R_{Int}$ = Internal reflection; $a^*_{Int}$, $b^*_{Int}$ C = $a^*$ $b^*$ values measured on the internal side The variation obtained in a*, b* values both on the glass side (G) and coated side (C) of the present thin multilayer coating 200 are strikingly different from that recorded by the prior art references. The negative a* and b* ($a^*_{Ext}>b^*_{Ext}$) value in the external reflection of the prior art patent resulted in a gray colored appearance in external reflection. In the present disclosure, the stack of thin multilayers has been engineered to obtain a bright golden color external reflection, a desired light transmission level and solar factor by optimizing the thicknesses of the outer most dielectric layer and silver metal functional layer.

Further the differences in terms of the performance values of the prior art reference and the present disclosure (Example 1) are shown in Table 6. It becomes evident from the table that the solar factor and insulation factor (U value) of the present disclosure are more improved compared to the prior art reference. In addition to such performance the solar control glass article 100 of the present disclosure brings special golden aesthetics in external reflection.

TABLE 6

Comparative Performance Values

| Performance | Emissivity | U-value | SF |
|---|---|---|---|
| CN204340313 U | — | 1.77 | 0.31 |
| Current invention | 0.04 | 1.6 | 0.22 |

INDUSTRIAL APPLICABILITY

The solar control glass article 100 of the present disclosure can be used in a double or triple glazing unit or in laminated form. These glazings are installed in such a way that the multilayer coating is preferably on face 2 (for DGU) or face 4 (for DGU comprising a composite glazing), the faces of substrates being numbered from outside to the inside of the building or room which is equipped therewith, giving it a solar radiation protection effect. These glazings exhibit an emissivity value equal to or less than 12% (most preferably less than 4%). The solar control glass article 100 can also be used in building wall cladding panel of curtain walling for interior applications. The heat treated solar control glass article 100 of the present disclosure can also be used for building interior applications.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

LIST OF ELEMENTS

Title: Solar Control Glass Article
100 Heat Treated Solar Control Glass Article
101 Coating Side
102 Glass Side
110 Glass Substrate
110*a* Glass Substrate
110*b* Glass Substrate
120 Metal Nitride Absorber Layer
130*a* First Transparent Dielectric Layer
130*a* Second Transparent Dielectric Layer
130*c* Third Transparent Dielectric Layer
140 Functional Layer
150*a* Lower Blocker Layer
150*b* Upper Blocker Layer
160 Over Layer
200 Thin Multilayer Coating
300 Composite Glazing
310 Polymeric Interlayer
400 Double Glazing Unit (DGU)
500 DGU Comprising Composite Glazing
410 Air Gap
1 Face 2 Face
3 Face
4 Face
5 Face
6 Face

We claim:

1. A solar control glass article comprising:
a transparent substrate having a first surface provided with a thin multilayer coating comprising:
an absorber layer sandwiched between a first and second transparent dielectric layers, wherein the absorber layer comprises at least one metal nitride selected from the group consisting of niobium, tantalum, molybdenum, titanium and zirconium;
a functional layer protected by an upper and lower blocker layers, wherein the functional layer comprises silver or a metallic alloy comprising silver and the upper and lower blocker layer comprises one or more metal alloys selected from Ti, Nb, Zr, Ni, Cr or their nitrides thereof; and
a third transparent dielectric layer provided over the upper blocker layer,
wherein the lower blocker layer is provided directly over the second transparent dielectric layer lying above the absorber layer, wherein the thickness of the functional layer and the thickness of the transparent dielectric layers are adjusted to give a gold colored reflection on a surface opposite to the first surface of the transparent substrate provided with a thin multilayer coating.

2. The solar control glass article as claimed in claim 1, wherein the thin multilayer coating optionally comprises an overcoat layer comprising at least one metal oxide selected from the group consisting of titanium, zinc, chromium or zirconium or their alloy and any combination thereof provided directly over the upper blocker layer and having a thickness greater than 3 nm and less than 10 nm.

3. The solar control glass article as claimed in claim 1, wherein the absorber layer comprises niobium nitride having a thickness greater than 1 nm and less than 10 nm.

4. The solar control glass article as claimed in claim 1, wherein the transparent dielectric layers are based on aluminium nitride, aluminium oxynitride, silicon nitride or silicon oxynitride or silicon aluminium nitride.

5. The solar control glass article as claimed in claim 1, wherein the thickness of the first transparent dielectric layer provided directly over the first surface of the transparent substrate is greater than 10 nm and less than 30 nm.

6. The solar control glass article as claimed in claim 1, wherein the thickness of the second transparent dielectric layer is greater than 10 nm and less than 40 nm.

7. The solar control glass article as claimed in claim 1, wherein the thickness of the third transparent dielectric layer is greater than 50 nm and less than 90 nm.

8. The solar control glass article as claimed in claim 1, wherein the thickness of the functional layer is greater than 5 nm and less than 15 nm.

9. The solar control glass article as claimed in claim 1, wherein the thickness of the upper and lower blocker layers is greater than 0.5 nm and less than 5 nm.

10. The solar control glass article as claimed in claim 1, wherein the thin multilayer coating is applied on the air side of the transparent substrate.

11. The solar control glass article as claimed in claim 1, wherein the transparent substrate is made of clear glass or tinted glass.

12. The solar control glass article as claimed in claim 1 is annealed or heat treated to a temperature above 500° C. and below 750° C.

13. A composite glazing comprising:
a plurality of glass substrates, wherein at least one glass substrate comprises a thin multilayer coating having solar control properties as claimed in claim 1; and
at least one polymeric interlayer configured to bond the plurality of glass substrates, wherein the thin multilayer coating may be in contact with the polymeric interlayer.

14. The composite glazing as claimed in claim 13, wherein the polymeric interlayer is made of polyvinyl butyral (PVB) and/or other organic polymers selected from the group consisting of polyurethane and/or ethylvinylacetate (EVA) and/or polyvinyl chloride and/or polyester and/or polyethylenevinylacetate (PET) and/or polycarbonate and/or polypropylene and/or polyethylene and/or polyurethacrylate or their combinations thereof.

15. An insulated glazing incorporating the composite glazing as claimed in claim 13, the thin multilayer coating is on face 4, the faces of substrates being numbered from outside to the inside of the building or room which is equipped therewith, giving it a solar radiation protection effect.

16. An insulated glazing incorporating the transparent substrate as claimed in claim 1, the thin multilayer coating is on face 2, the faces of substrates being numbered from outside to the inside of the building or room which is equipped therewith, giving it a solar radiation protection effect.

17. The insulated glazing as claimed in 16 exhibits an emissivity value of less than 12%.

18. The insulated glazing as claimed in 16 has a solar factor less or equal to 0.5.

19. The insulated glazing as claimed in 16 wherein the thin multilayer stack has a light transmission (TL) ranging between 15% to 40% and exhibits positive b* values in both external reflection and transmission.

20. A building wall cladding panel of curtain walling comprising the transparent substrate as claimed in claim 1.

* * * * *